(12) United States Patent
Gamburg et al.

(10) Patent No.: US 9,370,198 B2
(45) Date of Patent: Jun. 21, 2016

(54) DEFORMABLE CONTAINER AND DISPENSING MACHINE

(71) Applicant: Container Innovations LLC, Englishtown, NJ (US)

(72) Inventors: Roman Gamburg, Englishtown, NJ (US); Ilya Margolin, Longmeadow, MA (US)

(73) Assignee: CONTAINER INNOVATIONS LLC, Englishtown, NJ (US)

( * ) Notice: Subject to any disclaimer, the term of this patent is extended or adjusted under 35 U.S.C. 154(b) by 0 days.

(21) Appl. No.: 14/475,304

(22) Filed: Sep. 2, 2014

(65) Prior Publication Data

US 2015/0060486 A1    Mar. 5, 2015

Related U.S. Application Data

(60) Provisional application No. 61/871,996, filed on Aug. 30, 2013.

(51) Int. Cl.
*B65D 35/28* (2006.01)
*A23G 9/50* (2006.01)
*B65D 85/78* (2006.01)

(52) U.S. Cl.
CPC . *A23G 9/50* (2013.01); *B65D 85/78* (2013.01)

(58) Field of Classification Search
CPC .................................. A23G 9/50; B65D 85/78
USPC ........................................................... 222/95
See application file for complete search history.

(56) References Cited

U.S. PATENT DOCUMENTS

| | | | |
|---|---|---|---|
| 2,880,902 A | | 4/1959 | Owsen |
| 2,899,110 A | | 8/1959 | Parker |
| 3,143,429 A | | 8/1964 | Swanson et al. |
| 3,220,544 A | * | 11/1965 | Lovell ............ A61J 7/0046 206/218 |
| 3,471,058 A | | 10/1969 | Latham et al. |
| 4,773,458 A | * | 9/1988 | Touzani ............ B65D 1/0292 138/121 |

(Continued)

OTHER PUBLICATIONS

"One Shot Ice Cream Containers." The One Shot Corporation. <http://www.one-shot.com/ice-cream-dispensing/ice-cream-containers.html>. 2013.

(Continued)

*Primary Examiner* — Kevin P Shaver
*Assistant Examiner* — Jeremy W Carroll
(74) *Attorney, Agent, or Firm* — Pearl Cohen Zedek Latzer Baratz LLP

(57) ABSTRACT

A deformable container for single serving of a viscous or semi-solid product from an associated dispensing machine, the deformable container having a cylindrical or conical shape with two opposing end walls and at least one collapsible side wall connecting the first and second end walls, wherein one end wall is provided an opening with a cover through which the product is dispensed from the container. The collapsible side wall may have a cylindrical shape with a plurality of pleats arranged in an accordion-like shape, and be configured to collapse on itself into a substantially flattened position while maintaining a vertical alignment of each pleat. The collapsible side may be conical with a plurality of pleats arranged in a corrugated-like shape, and be configured to collapse on itself into a substantially flattened position wherein the pleats are arranged horizontally next to each other. The container may additionally include a lock mechanism for maintain the flattened shape.

13 Claims, 12 Drawing Sheets

(56) References Cited

U.S. PATENT DOCUMENTS

| | | | |
|---|---|---|---|
| 4,873,100 A * | 10/1989 | Dirksing | B29C 49/48 215/311 |
| 5,215,222 A | 6/1993 | McGill | |
| 5,224,613 A | 7/1993 | Robbins, III | |
| 5,232,027 A * | 8/1993 | Tanaka | B65B 3/12 141/114 |
| 5,333,761 A * | 8/1994 | Davis | B65D 51/242 222/212 |
| 5,417,337 A | 5/1995 | Robbins, III | |
| 5,439,128 A * | 8/1995 | Fishman | A45F 3/20 206/218 |
| 5,584,413 A | 12/1996 | Jung | |
| D407,093 S | 3/1999 | Wells | |
| 5,893,485 A | 4/1999 | McGill | |
| 5,913,342 A | 6/1999 | McGill | |
| 5,918,767 A | 7/1999 | McGill | |
| 6,105,815 A * | 8/2000 | Mazda | B65D 1/0292 215/382 |
| 6,182,862 B1 | 2/2001 | McGill | |
| 6,319,532 B1 | 11/2001 | Pineault | |
| 6,715,648 B2 | 4/2004 | Kim | |
| 7,017,783 B1 * | 3/2006 | Hunter | A23G 9/00 222/146.6 |
| 7,165,699 B2 | 1/2007 | McGill | |
| 7,654,402 B2 * | 2/2010 | Kusuma | B65D 21/086 220/666 |
| 8,529,974 B2 | 9/2013 | Ortiz et al. | |
| 2008/0099476 A1 * | 5/2008 | Fung | A47J 36/02 220/6 |
| 2009/0114657 A1 * | 5/2009 | Hsu | B65D 21/086 220/574 |
| 2009/0202684 A1 | 8/2009 | Willemsen et al. | |
| 2011/0248040 A1 | 10/2011 | McGregor | |

OTHER PUBLICATIONS

"2014 Creative FAD CE LFGB standard silicon travel water milk coffee saucers cups, worked as ice cream pudding mold, free shipping." <http://www.aliexpress.com/item/2014-Creative-FAD-CE-LfFGB-standard-silicon-travel-water-milk-coffee-cups-saucers-worked-as-ice/1813183549.html>. 2014.

International Search Report for PCT International Application No. PCT/US2014/053735, mailed Dec. 23, 2014.

Office Action for U.S. Appl. No. 14/475,294, mailed Oct. 28, 2015.

* cited by examiner

VIEW A

DEFORMABLE CONTAINER AND DISPENSING MACHINE

CROSS-REFERENCE TO RELATED APPLICATIONS

This application claims priority to U.S. Provisional Patent Application No. 61/871,996, filed Aug. 30, 2013, which is hereby incorporated by reference in its entirety.

FIELD OF THE INVENTION

The present invention relates to an apparatus for dispensing viscous or semi-solid product (e.g., ice-cream) from prefilled containers, preferably single-serving deformable containers, and to the prefilled containers that are designed for use therewith so that the product they contain is dispensed by extrusion.

BACKGROUND OF THE INVENTION

Ice cream is typically dispensed at the point of sale in pre-packed form by scoops out of large containers in a refrigerator, or in a flow from a freezing, mixing and dispensing machine.

Dispensing ice cream by scoop from a container has the advantage of inexpensive production and transport, but dispensing the ice cream is slow, especially when the proper hygienic precautions are taken. Scoop-dispensed ice cream also provides the facility for providing a range of ice cream including those containing fruit, nuts and other solids. However, freezers for maintaining the containers of ice cream can be large and bulky, and large commercial ice cream containers are susceptible to contamination.

Machines for dispensing so called "soft' or "soft-serve" ice cream are known, wherein liquid ingredients are loaded into a machine that mixes, freezes and dispenses the ice cream into cones or other containers. Such machines have previously had high power requirements and are expensive to manufacture. Additionally, different mixing and dispensing equipment is required for each flavor, such that it is usual for such machines to have a capacity for only one, two or, perhaps, three flavors. Moreover, these machines are often difficult to maintain, and, due to the nature of the product which must be used, the quality of the ice cream dispensed therefrom does not compare favorably with the possible quality of products dispensed by scoop.

Hygiene requirements for dispensing food products are becoming stricter. Moreover, convenience and variety of product are of greater importance. Pre-packed ice cream is relatively expensive to produce and distribute but has the advantage that a wide range of flavors and types of ice cream can be sold at a single outlet, the only requirement being a refrigerator to keep the product frozen. Thus, dispensing soft serve product from prefilled containers permits service of a large variety of flavors utilizing simple, inexpensive equipment with minimum level of labor and with conformity to the highest modern hygienic standards.

However, an important aspect of using prefilled containers is a filling process. Design of the container must to provide a practical way for filling from small dispensers as well as use in high output production lines.

Various types of deformable containers are already known for single serving, pre-packaged ice cream, but problems exist with these containers.

For example, devices that serve the above purposes are known and already used by UNILEVER® (e.g., U.S. Pat. No. 7,017,783 to Jeffrey Hunter et al., which is hereby incorporated by reference in its entirety) and ONE SHOT® (e.g., U.S. Pat. No. 5,918,767 to Shane Robert McGill, which is hereby incorporated by reference in its entirety). By providing dispensing apparatus and a single serving dispensing containers, these disclosures help alleviate hygienic concerns. However, these containers are not environmentally friendly, as they require large spaces for transportation and waste management.

Specifically, it is often the case that the single serving dispensing containers must be shipped over considerable distances to distributors who fill with the product and then ship the product-filled containers to retail locations. During the initial shipment to distributors, the empty containers fill a large a volume that is mostly air. The same issue happens when the prefilled container is disposed of (after dispensing of the product), transported to a waste management facility and placed in a landfill.

In addition, these containers are made of rigid structures with relatively thick plastic walls that become a great environmental concern, because plastic materials are, for the most part, not biodegradable. Moreover, these containers are products of a molding process that necessarily produces containers with walls having significantly greater thickness than desired (e.g., above 0.7 mm) and, therefore, require greater power consumption to deform the container when dispensing the product. By contrast, the thermoforming process allows fabrication of collapsible containers with equal thicknesses from 0.1 mm and up.

U.S. Pat. No. 6,715,648, issued Apr. 6, 2004 to Hui-Taek Kim, which is incorporated by reference herein in its entirety, discloses an ice cream dispenser which is directed to effectively discharging an ice cream from the interior of a dispensing container without any transformation and damage of the dispensing container. However, Kim's empty container is cumbersome to transport due to its lack of collapsibility and stack-ability, and the empty container also leaves behind a large and bulky waste product that causes the environmental concerns described above.

U.S. Pat. No. 5,913,342, issued Jun. 22, 1999 to Shane Robert McGill, which is incorporated by reference herein in its entirety, discloses deformable containers which are of generally cylindrical in shape having end walls at opposite ends, one end wall including an opening and the other end wall configured to be engaged for moving that end wall relative to the other, during which movement the side walls are deformed. The side walls may have a concertina-like formation to enable deformation to take place, so as to reduce the length and volume of the container and discharge the contents of the container. With the concertina-like formation the side wall may comprise a plurality of pleats, which close up and open out during deformation of the container. However, McGill's cylindrical shape makes these deformable containers difficult to store and transport due to their lack of stack-ability once deformed. In addition, the containers involve overly complicated methods of collapsing that needlessly raises manufacturing and material costs. Similar problems exist with U.S. Pat. No. 5,215,222, issued Jun. 1, 1993 to Shane Robert McGill, which is incorporated by reference herein in its entirety.

U.S. Pat. No. 5,232,027, issued on Aug. 3, 1993 to Toshinori Tanaka et al., which is incorporated by reference herein in its entirety, depicts an extrudable package having a conical shape that is formed of thin and relatively hard plastic, which includes a main body wall formed with a number steps, an opening closed by a lid having a discharge opening and an auxiliary lid having pull tab. When the extrudable package is pressed, the main body deforms so as to become flat, and the soft ice cream food is extruded through the discharge opening and dispensed into a food container. However, U.S. Pat. No. 5,232,027 provides no explanation as to how the extrudable container is collapsible, and it is conceivable that it would be difficult, if not impossible, to collapse Tanaka's container due to its relatively hard material and to the strict 90 degree step-wise shape of the main body wall. Additionally, while Tanaka explains that the extrudable container may be flattened, Tanaka fails to contemplate and overcome any spring-back action that may prevent the container, once deformed, from maintaining its flattened shape.

U.S. Pat. No. 5,439,128, issued Aug. 8, 1995 to Avraham Fishman, which is incorporated by reference herein in its entirety, discloses a three-dimensional structure of concentric rings forming a container of plastic material, wherein a plurality of concentric ring-shaped wall elements adjoin each other to form a generally frusto-conically shaped wall of the container. Adjacently adjoining wall elements are inclined with respect to each other, and the wall elements are connected to each other with a ring-shaped area of reduced wall thickness, forming a film hinge. The wall elements are inclined so that they can be turned down over adjoining elements to collapse the container. However, the intricate design and alternating wall thicknesses of Fishman's container most likely raises production costs. Also, and similar to U.S. Pat. No. 5,232,027 discussed above, Fishman fails to contemplate and overcome any spring-back action that may prevent the container, once deformed, from maintaining its flattened shape.

None of the above-recited patents solve the current problems associated with one-time-use dispensing containers, namely bulky waste, inconvenience, expensive and cumbersome transportation, high material costs, and the likelihood that the disposable container may fail to maintain a flattened shape after dispensing. Stackability is a desirable structural feature of a deformable container, both prior to being filled and after being emptied, because it decreases the volume needed to transport the container. Additionally, maintaining a flattened shape after deformation is a desirable structural characteristic of a deformable container because it decreases the volume needed to store and transport the container, in addition to reducing the volume of waste product produced.

SUMMARY OF THE INVENTION

Accordingly, it is the object of the present invention to provide a deformable container especially suitable for dispensing food products, which is simple, adaptable and hygienic.

It is another object of the present invention to provide a deformable container that is collapsible into a substantially flattened shape after dispensing of the food product contained within. In certain embodiments, the deformable container may reversibly expand and contract (e.g., collapse). In preferred embodiments, the deformable container is configured to maintain (e.g., lock in) a flattened shaped after it is collapsed.

In certain embodiments, the deformable container is a single-use, disposable container for dispensing a viscous or semi-solid product such as, for example, ice cream, although other viscous or semi-solid products are contemplated.

In certain embodiments, the deformable container has a generally cylindrical or conical (e.g., frustoconical) shape comprising a first end wall, a second end wall or opening opposing the first end wall, and at least one collapsible side wall connecting the first end wall and the opening or connecting the first and second end walls. The first end wall may include a recess configured to engage with a plunger of an associated dispensing machine. The second end wall may include an opening (e.g., an outlet opening) configured to allow the viscous or semi-solid product stored within the container to be dispensed therethrough upon deformation of the container by collapsing of the at least one collapsible side wall.

In certain embodiments, the collapsible side wall of the deformable container has a conical (e.g., frustoconical) shape wherein the at least one side wall is formed at an angle of between 45 to 89 degrees relative to the first and second end walls.

In one embodiment, the at least one collapsible side wall has a plurality of ridges, steps, pleats, or wall segments arranged in an accordion-like shape, and the at least one collapsible side wall is configured to collapse onto itself into a substantially flattened position, wherein the ridges, steps, pleats, or wall segments are oriented horizontally and stacked vertically one atop another.

In another embodiment, the at least one collapsible side wall has a plurality of ridges, steps, pleats, or wall segments arranged in a corrugated-like shape, and the at least one collapsible side wall is configured to collapse onto itself such that the container has a substantially flattened configuration, wherein the ridges, steps, pleats, or wall segments are oriented vertically and arranged next to and adjacent each other. In this embodiment, the deformable container may have a conical shape wherein the ridges, steps, pleats, or wall segments are formed of a plurality of concentric rings of differing diameters. For example, the diameters of each wall segment or pleat may increase in the direction from the first end wall towards the second end wall.

In certain embodiments, the deformable container includes a locking mechanism configured to lock the deformable container in a flattened configuration thereby maintaining the flattened configuration.

In one embodiment, the locking mechanism may include a lip or notch on the lid that is configured to allow at least one ridge/step (e.g., pleat) of the at least one collapsible side wall to be gripped or held (e.g., snap-locked) once the side wall is collapsed. In another embodiment, a protrusion on an internal surface of the first end wall may be configured to engage with an opposing recess on the lid or with the outlet opening in the lid. In yet another one embodiment, the deformable container may self-lock wherein wall segments of the at least one side wall snap into a locking configuration upon being compressed during dispensing.

In certain embodiments the present invention includes a dispensing apparatus for dispensing the viscous or semi-solid product from the deformable container.

BRIEF DESCRIPTION OF THE DRAWINGS

The subject matter regarded as the invention is particularly pointed out and distinctly claimed in the concluding portion of this specification. The invention, however, both as to organization and method of operation, together with objects, features, and advantages thereof, may best be understood by reference to the following detailed descriptions when read with the accompanying drawings in which:

Figure 1:
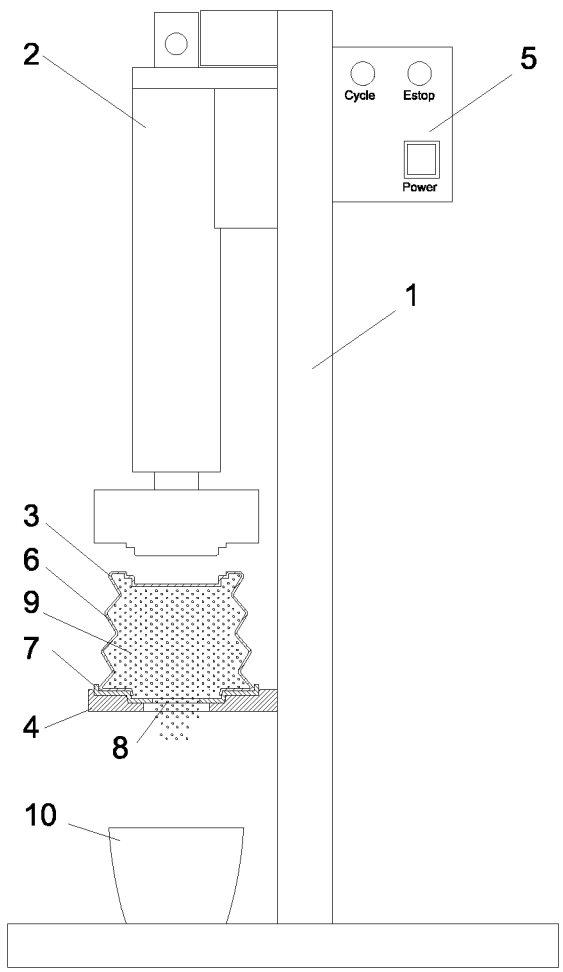
FIG. 1 shows a side elevation and cross-sectional view of a dispensing apparatus and deformable container according to aspects of certain embodiments of the present invention.

It will be appreciated that for simplicity and clarity of illustration, elements shown in the figures have not necessarily been drawn to scale. For example, the dimensions of some of the elements may be exaggerated relative to other elements for clarity. Additionally, the many features of any one embodiment shown in a figure should not be considered independent and separate from the features of an embodiment shown in another figure, and it is conceivable that features of any one embodiment may be combinable with another. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components have not been described in detail so as not to obscure the present invention.

A purpose of the present invention is to provide a collapsible, deformable, thin-walled dispensing container which does not take up unnecessary space during transportation and maintains a flattened shape after dispensing.

Reference is now made to the drawings, which show in greater detail several views of a dispensing apparatus and deformable container according to aspects of certain embodiments of the present invention.

Figure 2:
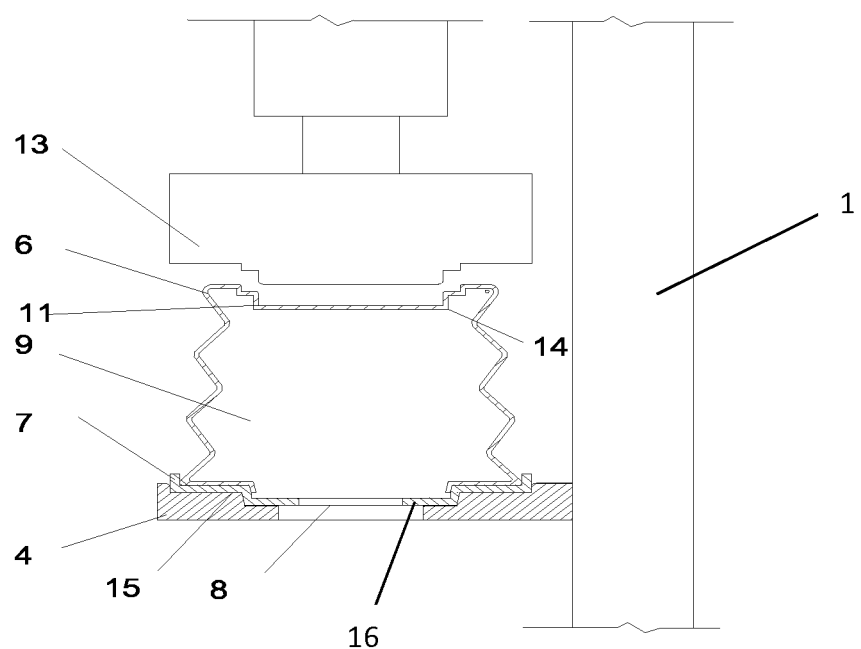
FIG. 2 shows a side elevation and cross-sectional view of a deformable container loaded into a dispensing apparatus according to aspects of certain embodiments of the present invention.

In certain embodiments of the present invention, a deformable container is collapsible to a substantially flattened shape and may, in some embodiments, reversibly expand and contract (e.g., collapse) as needed. In certain embodiments, as shown in FIGS. 1 and 2, deformable container 3 may include a first end wall 14, a second end wall 15 opposing the first end wall, at least one collapsible side wall 6 connecting first end wall 14 and second end wall 15, and a lid 7 with outlet opening 8. In certain embodiments, second end wall 15 is only partial, with a large opening formed therethrough for use during filling of container 3. Deformable container 3 has a volume 9 that may be filled with a viscous or semi-solid product (e.g., ice cream).

In certain embodiments, the deformable container is a single-use, disposable container for dispensing a viscous or semi-solid product such as, for example, ice cream, although other viscous or semi-solid products are contemplated. In general, the deformable container may be pre-filled with the viscous or semi-solid product and sealed against contamination. In operation, a user may unseal the container and dispense the product therefrom.

Figure 3:
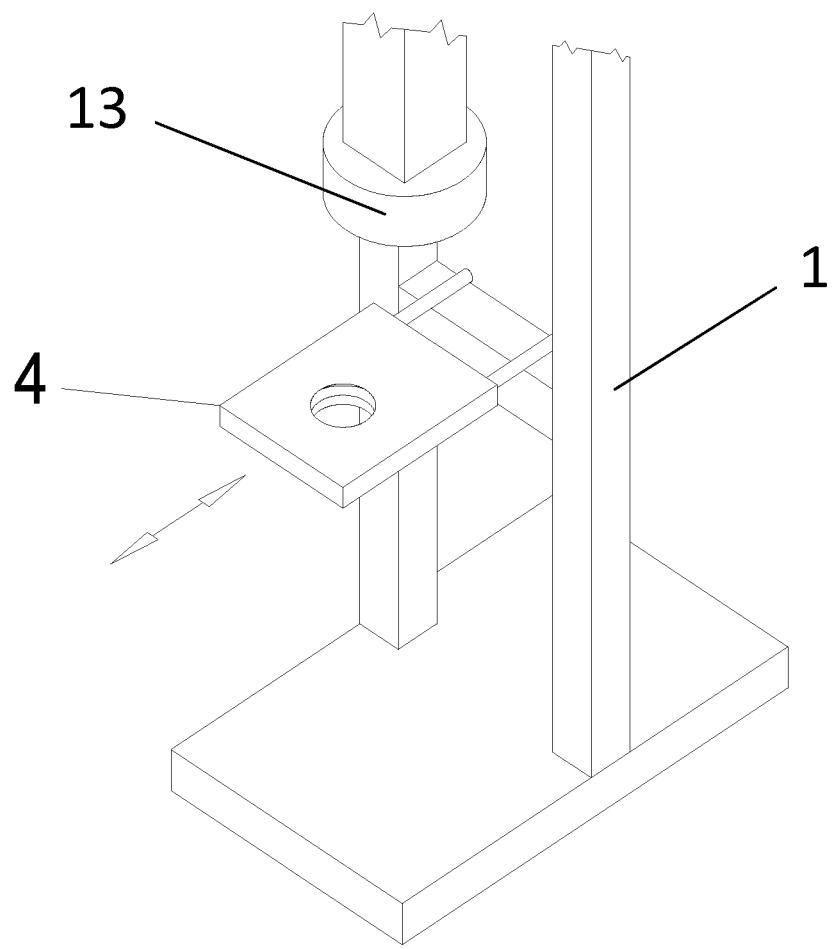
FIG. 3 shows a perspective view of a dispensing apparatus with a seat/platform according to aspects of certain embodiments of the present invention.

As shown in FIGS. 1-3, the dispensing apparatus may be as known in the art and may include a base, a supporting frame 1 and a movable seat/platform 4 for supporting the deformable container 6 during dispensing of the product 9 therefrom. The dispensing apparatus may include a constant torque linear actuator 2 with a deforming means movable to engage and deform the deformable container 6 to discharge product from inside the volume 9 of the container 6 through an outlet or opening in the second end wall. In preferred embodiments, the deforming means is a plunger 13 that is movable in a generally vertical direction, whereby operation of plunger 13 of the dispensing apparatus moves the first end wall of the container towards the second end wall of the container to deform (e.g., collapse, flatten) the at least one collapsible side wall. In certain embodiments, plunger 13 includes a plunger head/protrusion that is generally cylindrical.

In certain embodiments, seat 4 is of suitable size and shape that fit to contain deformable container 3 containing product in a stable position by a perfect side fit between cover shape 7 and seating 4, as shown in FIG. 2. Seat 4 is movable between an operating position, in which deformation takes place, and a non-operating position, in which the container may be placed in and removed from the seat. For example, when the seat is in the operating position, the seat is located vertically below the plunger. In preferred embodiments, the plunger is movable only when the seat is in the operating position.

In certain embodiments, the dispensing apparatus may have a manually or power-operated drive mechanism that causes the plunger to be reciprocally movable towards and away from a deformable container in a dispensing operation of the apparatus. The drive mechanism may be electrically, hydraulically, gas, and/or hand operated. In certain embodiments, the power-operated drive mechanism may be automated using methods implementing the computing devices described below.

In certain embodiments, dispensing apparatus is arranged so that linear actuator 2 cannot be operated unless container 3 is in the operating position beneath plunger 13. In operation, vertical linear actuator 2 with plunger 13 engage deformable container 3 downward, causing compression of container 3, thereby extruding the product towards the cover outlet 8 of container 3, so that the product emerges and drops into any receptacle 10 placed below.

The amount of product within container 3 can be selected according to predetermined requirements, such as the size of a predetermined portion of product to be received by receptacle 10. Also, several portions may be discharged from same container, simply by halting the movement of the discharge plunger 13 in an intermediate position when sufficient product has been discharged. Thus, container 3 may be of any suitable size.

As shown in of FIG. 1, control box 5 provides control for automatically energizing the linear actuator 2 when it detects that a dispensing operation can be performed and for returning the plunger to its upper position when the container is fully discharged. Control box 5 also controls the rate of discharge and provides user interface and safety functions such as: cycle, emergency stop, torque control for linear actuator, extrusion watch dog timer and cycles counter.

In certain embodiments, as shown in FIGS. 1 and 2, the first end wall 14 of the deformable container 3 includes a recess/depression 11 whose external surface is configured to be engaged by a protrusion on plunger 13 of dispensing apparatus. The second end wall includes an opening 8 configured to receive the semi-solid product and facilitate dispensing of the viscous or semi-solid product upon collapse of the at least one collapsible side wall.

In certain embodiments, the second end wall is not a complete wall, but rather only a partial wall at the end of the deformable container 3 opposite to the first end wall 14. In some embodiments, the second end wall may be a large opening defined by the circumference of the terminal end of the collapsible side wall 6 of the deformable container 3 opposite to the first end wall 14, although other configurations are contemplated. In preferred embodiments, the large opening facilitates filling of the deformable container with the viscous or semi-solid product. In certain embodiments, second end wall may be covered by a cover or lid, as discussed below.

Figure 5:
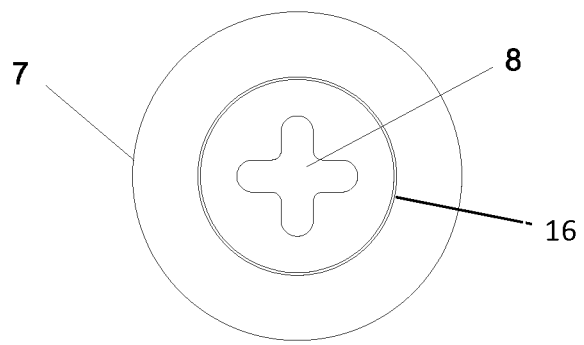
FIG. 5 shows a lid of the deformable container with an opening for extrusion according to aspects of certain embodiments of the present invention.
Figure 9:
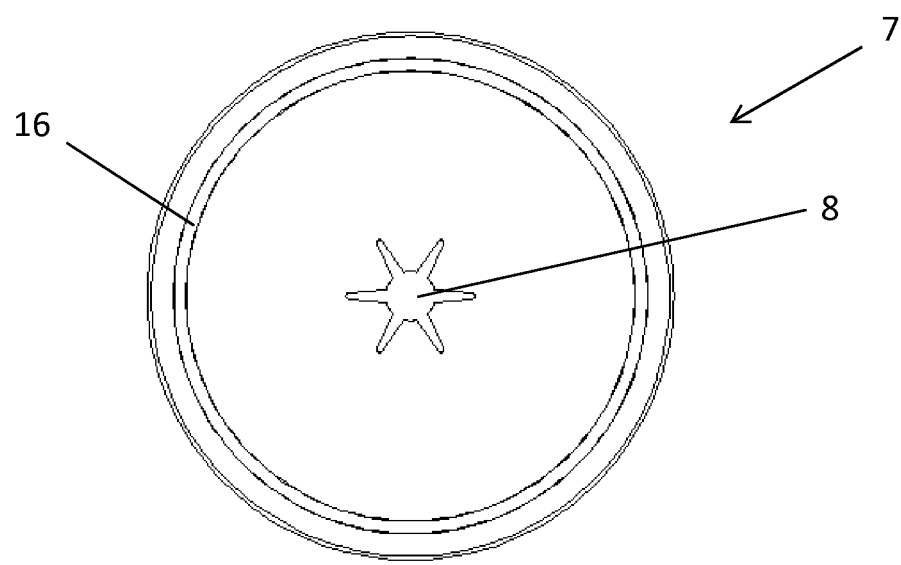
FIG. 9 shows another lid of the deformable container with an outlet opening for extrusion according to aspects of certain embodiments of the present invention.

In certain embodiments, as shown in FIGS. 5 and 9, the deformable container 3 includes a lid (e.g., cover) 7 that is configured to be assembled onto the container after the container is filled with the product. In some embodiments, lid 7 is configured to engage (e.g., connect, attach) with the second end wall of the deformable container.

Figure 4:
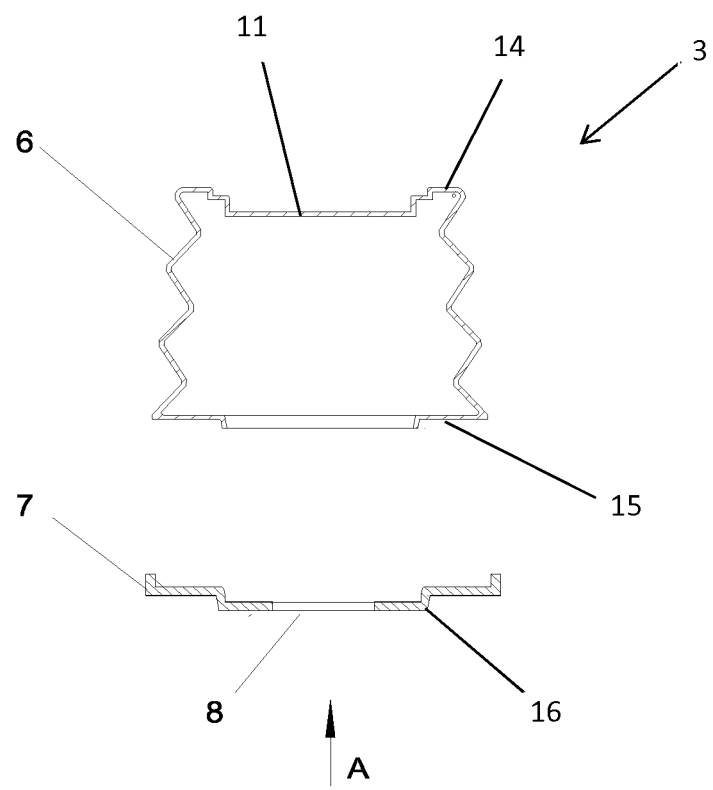
FIG. 4 shows a cross-sectional view of a deformable container with collapsible accordion-like side walls and an accompanying lid according to aspects of a certain embodiments of the present invention.

FIG. 5 depicts lid 7 from view angle A of FIG. 4, which illustrates an external surface of lid 7. As shown in FIG. 5, lid 7 is generally circular in shape, although other shapes are contemplated, preferably to match the configuration of end wall 15. Lid 7 may have at least one outlet opening 8 for discharging or extruding the product to be dispensed, as shown in FIGS. 4 and 5. In preferred embodiments, outlet opening 8 is located in a radial center of circular lid 7 as illustrated in FIG. 5, although other embodiments wherein outlet opening 8 is in an off-center position is contemplated. In some embodiments, the outlet opening 8 is small relative to the large opening of the second end wall. In this way, dispensing the product is more controllable.

The lid 7 may further include at least one seal (not shown) on the at least one outlet opening 8 that is configured to be removed prior to use of the prefilled container 3 in order to allow the product contained within prefilled container 3 to be dispensed through outlet opening 8.

In some embodiments, lid 7 may have a recess 16 formed therein or thereon, as will be described below. Recess 16 is typically circular in shape and centered radially on lid 7.

In certain embodiments, the lid 7 is manufactured from a relatively rigid material and should be sufficiently thick to ensure that the lid structure remains rigid during product dispensing. The lid 7 may be attached to the deformable container by, without limitation, friction fit, snap fit, weld, screwing, gluing, bonding or otherwise fusing or connecting the lid to the container.

In alternative embodiments, product dispensing may be performed through the end of the container opposing the lid (not shown). In this embodiment, the end through which the dispensing is done is manufactured of the rigid material and will have at least one outlet opening for dispensing the product. When dispensing is performed through the end opposing the lid, the lid may be manufactured from a thin, flexible plastic or other material, although it is not limited to this.

Reference is now made to FIG. 4, which shows a cross-sectional view of a deformable container 3 having a substantially cylindrical shape with at least one collapsible accordion-like side wall 6 and an accompanying lid 7, according to aspects of a first embodiment of the present invention. In this embodiment, the at least one collapsible side wall 6 of the deformable container 3 has a cylindrical shape. In this embodiment, the cylindrically shaped collapsible side wall has a plurality of ridges, steps, pleats, or wall segments arranged in an accordion-like shape, and configured to collapse onto itself into a substantially flattened position, wherein the ridges, steps, pleats, or wall segments are oriented horizontally and stacked vertically one atop another. An example of the vertical stacking of the ridges, steps, pleats, and wall segments in the collapsed container may be seen, for example, in FIG. 6.

Figure 6:
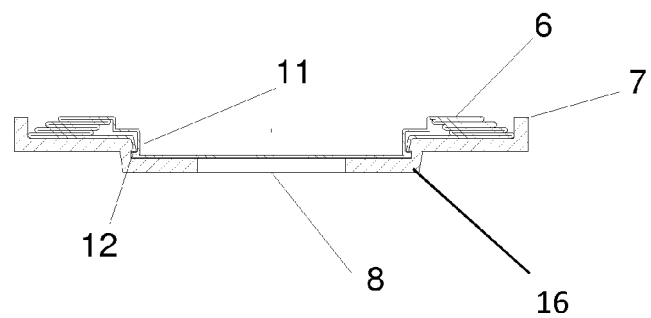
FIG. 6 shows a cross-sectional view of the deformable container and lid depicted in FIG. 4 in a substantially flattened or compressed configuration according to aspects of certain embodiments of the present invention.

FIG. 6 shows a cross-sectional view of the deformable container 3 depicted in FIG. 4 in a substantially flattened or compressed position according to aspects of the first embodiment of the present invention. As can be seen in FIG. 6, deformable container 3 has been collapsed to a substantially flattened position wherein the plurality of pleats of side wall 6 have been compressed into lid 7 while maintaining a vertical stacking of the pleats, which are now oriented horizontally. When deformable container 3 has a substantially cylindrical shape, pleats of side wall 6, once compressed, will be vertically stacked one on top of another. It is noted that FIG. 6 depicts side wall 6 as being stacked at an angle relative to lid 7, which indicates that deformable container 3 has a substantially cylindrical shape with side wall 6 being angled slightly inward, and it is contemplated that the vertically stacked side wall 6 may not be angled in this way.

Figure 7:
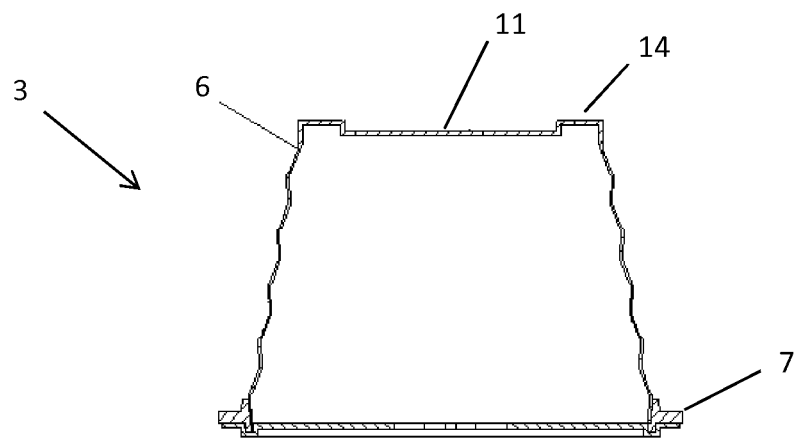
FIG. 7 shows a cross-sectional view of a deformable container with collapsible, corrugated-like side walls and an accompanying lid according to aspects of certain embodiments of the present invention.

Reference is now made to FIG. 7, which shows a cross-sectional view of another embodiment of deformable container 3 with an accompanying lid 7. In certain embodiments, the at least one collapsible side wall 6 of the deformable container 3 has a generally conical (e.g., frustoconical) shape. In certain embodiments, the at least one collapsible side wall 6 is formed at an angle of between 45 to 89 degrees relative to the second end wall 15 or lid 7. The angle of the at least one side wall 6 of the conically shaped container 3 relative to first end wall 14 and second end wall 15 ensures an improved pressure distribution inside the container during extrusion (e.g., dispensing) and prevents unexpected or undesired deformation of the deformable container 3.

In this embodiment, the at least one collapsible side wall 6 has a plurality of ridges, steps, pleats, or wall segments arranged in a corrugated-like shape, and the deformable container is configured to collapse on itself into a substantially flattened position, wherein, in the flattened position, the plurality of ridges, steps, pleats, or wall segments are oriented vertically and are arranged next to and adjacent each other. In this embodiment, the deformable container may have a conical (e.g., frustoconical) shape wherein the ridges, steps, pleats, or wall segments are formed of a plurality of concentric wall segments of differing diameters. For example, the diameters of each wall segment or pleat may increase in the direction from the first end wall 14 towards the second end wall 15. An example of the horizontal alignment of vertically-oriented ridges, steps, pleats, and wall segments of the at least one collapsible side wall 6 in the substantially flattened configuration may be seen in, for example, in FIGS. 10 and 11.

Figure 8A:
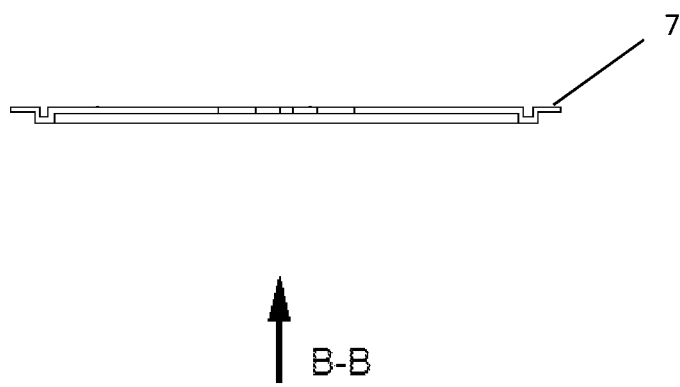
FIG. 8a shows a cross-sectional view of one type of lid for the deformable container according to aspects of certain embodiments of the present invention.
Figure 8B:
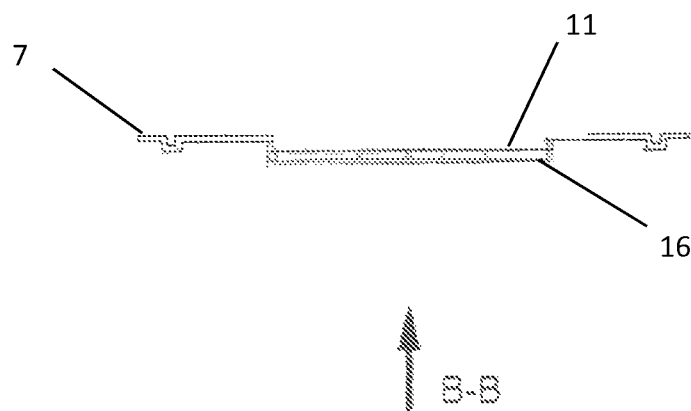
FIG. 8b shows a cross-sectional view of another type of lid for the deformable container according to aspects of certain embodiments of the present invention.

FIGS. 8a and 8b show side views, and FIG. 9 shows a plane view, of a lid 7 of the deformable container with an outlet opening 8 for extrusion according to aspects of the second embodiment of the present invention. FIG. 9 depicts lid 7 from view angle B-B in FIGS. 8a and 8b, and illustrates an external surface of lid 7. As shown in FIG. 9, lid 7 is general circular in shape, although other shapes are contemplated. In preferred embodiments, outlet opening 8 is located in a radial center of circular lid 7, although other embodiments wherein outlet opening 8 is in an off-center position is contemplated. Similarly, lid 7 may have a recess 16, which is typically circular in shape and centered radially on lid 7. It is noted that, in the embodiment of lid 7 depicted in FIG. 9, outlet opening 8 has a star shaped configuration, but other shapes of outlet opening 8 are contemplated.

Figure 15:
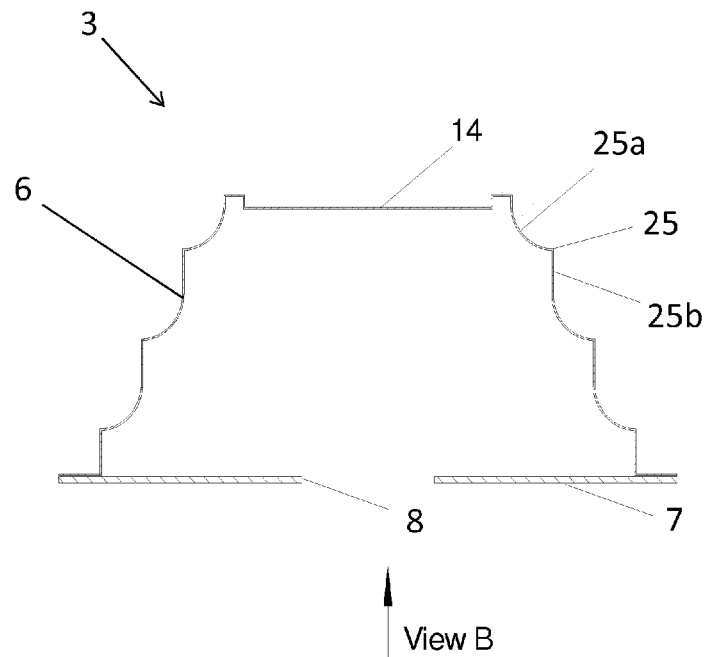
FIG. 15 shows a cross-section view of a deformable container with collapsible side walls according to aspects of certain embodiments of the present invention.
Figure 18:
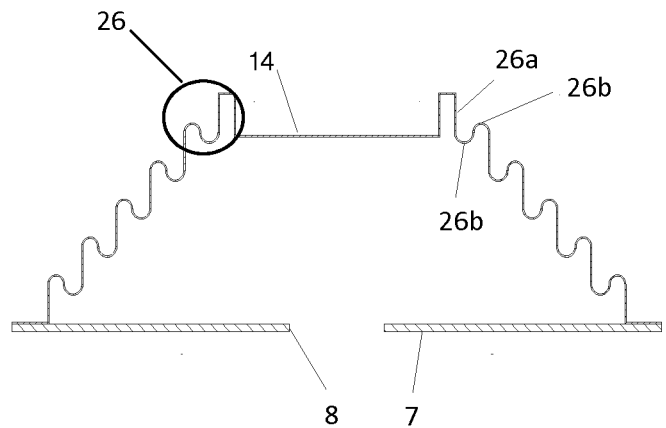
FIG. 18 shows a cross-sectional view of a deformable container with collapsible wall segments having vertical and curved sections according to aspects of certain embodiments of the present invention.

In an alternative embodiment of deformable container 3 shown in FIG. 7, as shown in FIGS. 15 and 18, the at least one collapsible side wall of the deformable container 3 includes at least one, preferably a plurality, of concentric wall segments. Each wall segment is stacked, adjoining and adjacent other wall segments, and together the wall segments form a frustoconical shape of the at least one side wall of the deformable container. For example, the wall segments are arranged from the first end wall to the second end wall or lid such that each wall segment has a greater diameter/circumference than the adjacent wall segment preceding it. In one version, each wall segment may include an arcuate, or curved section and a straight section extending in the direction from the first end wall to the second end wall or lid, such that each wall segment includes a straight wall element and a partially rounded element. Each concentric side wall segment may include a first diameter corresponding to the straight section and a second diameter corresponding to the curved section. In certain embodiments, the straight section of each concentric side wall segment is oriented vertically, such that the diameter of the straight section has no change (is constant) within in its respective wall segment of the collapsible side wall. Further, in certain embodiments, the diameter of each concentric wall segment increases along the curve of the curved section in a direction from the first end wall to the second end wall or lid. These alternate embodiments will be discussed in greater detail below.

It is noted that, although cylindrical and conical shapes are shown, the deformable container according to the present invention may have other shapes such as elliptical, oval, rectangular with rounded corners, or other curvilinear shapes, and is not limited to the shapes depicted in the drawings.

The deformable container and lid, according to embodiments of the present invention, may be manufactured from any material, but are preferably manufactured from a plastic material such as, without limitation, polypropylene, polystyrene, polyvinyl chloride, ethylene, polyvinyl acetate or polyethylene. In other embodiments, the container and lid may be made from paper or cardboard coated with a plastic material. Other materials are also contemplated.

In certain embodiments, the deformable container and lid are manufactured using methods known in the art such as, without limitation, injection molding, thermoforming, or blow-molding. The thermoforming process is preferred, due to the small thicknesses of the container, weight-saving capabilities, and reduced power consumption that may be achieved by the thermoforming process. Additionally, as known in the art, scrap and plastic waste from the thermoforming process may be recycled back into the thermoforming process, thereby helping to reduce waste.

In some embodiments, the first and second end walls may be manufactured from a first material, and the at least one side wall may be manufactured from a second material that is different from the first. In certain embodiments, the lid of the deformable container is manufactured to be thick and rigid (e.g., hard) relative to the at least one side wall, which is manufactured to be thin, pliable and deformable (e.g., collapsible).

Additionally, it is noted that the deformable container, as described herein, may be manufactured in two pieces wherein the container and the lid are formed separately, or may be manufactured as one piece wherein the lid is formed integrally with the container. It is also contemplated that the deformable container and lid may be manufactured initially as two pieces but formed into one piece by fusing the lid to the deformable container. The description of the drawings below should be interpreted as referring to both the one-piece and two-piece configurations of the deformable container except where otherwise noted.

While it is contemplated that deformable container 3 does not include a locking mechanism, the various embodiments of the present invention may also include one or more locking mechanisms. A locking mechanism may take any shape or form and is generally configured to maintain the deformable container in a flattened configuration following extrusion (e.g., dispensing) of the product. In some embodiments, the deformable container may self-lock wherein wall segments of the at least one side wall snap into a locking configuration upon being compressed during dispensing. In other embodiments, the deformable container may have features that allow portions to be held in a locked configuration upon compression of the deformable container during dispensing. Alternative locking mechanisms are contemplated, as discussed below.

Locking the deformable container in the flattened configuration reduces the volume of space occupied by the single-use deformable container, thereby reducing pollution, and ensuring a simplified and more effective mode of transportation (e.g., shipment) of the empty containers. In addition, the locking mechanism may prevent any rebound and re-expansion of the at least one side wall after collapsing the container and dispensing the product, which may occur due to the elasticity of the relatively thin structure of the at least one side wall. In certain embodiments, the locking mechanism is formed as part of the structure of the container itself, or the container and lid themselves, and includes no external parts or pieces.

In certain embodiments, the locking mechanism may include a lip or notch on the lid that is configured to allow at least one ridge/groove (e.g., pleat) of the at least one collapsible side wall to be gripped or held (e.g., snap-lock) once the side wall is collapsed.

Figure 12:
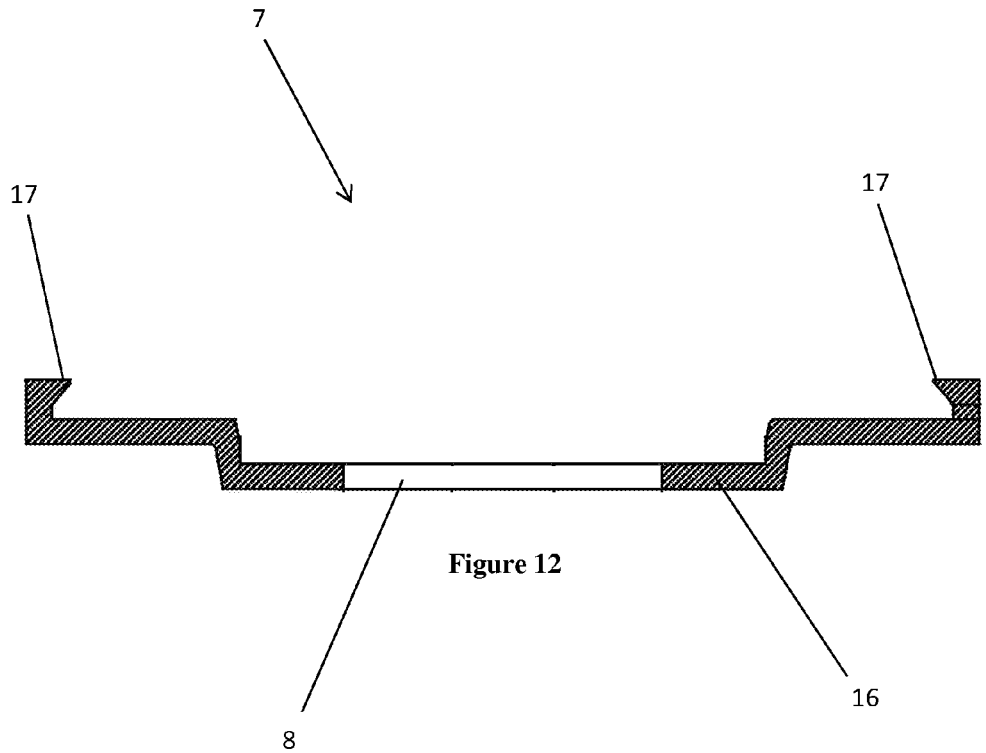
FIG. 12 shows a cross-sectional view of another type of lid for the deformable container according to aspects of certain embodiments of the present invention.

For example, as shown in FIG. 12, lid 7 may include an internally-directed projection, or a lip, 17 located on an inner circumference or periphery of a radially distal portion of lid 7. In certain embodiments, lip 17 is configured to catch and hold (e.g., snap-lock) each pleat of side wall 6 as each pleat passes lip 17 during compression of deformable container 3, as shown in FIG. 2. Lip 17 is configured to accept and hold all pleats of side wall 6 once container 3 has been compressed, such that deformable container 3 maintains a flattened shape following compression. Accordingly, in this embodiment, lid 7 should have a depth sufficient to encompass the entire vertical stack of the horizontally oriented pleats of side wall 6, once deformed, in order to enable locking of all pleats of side wall 6 under lip 17. It is contemplated that a top surface of the collapsed side wall 6 portion depicted in FIG. 6 may be configured to fit under and snap into lip 17.

Figure 11:
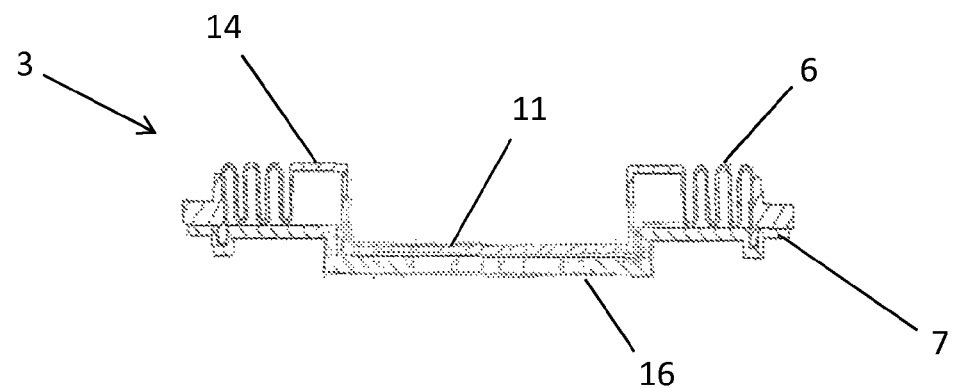
FIG. 11 shows a cross-sectional view of the deformable container of FIG. 7 with the lid of FIG. 8b in a substantially flattened or compressed configuration according to aspects of certain embodiments of the present invention.

In another embodiment of the locking mechanism, as shown in FIGS. 4, 8b, and 11, the locking mechanism may include a protrusion on a surface of the first end wall 14 configured to engage with an opposing recess on the lid 7. In certain embodiments, the protrusion is on an internal surface of the first end wall (e.g., inside the volume of the container). In some embodiments, the protrusion and the plunger recess on the first end wall are the same structure. That is, the plunger recess 11, which is formed into an external surface of the first end wall 14 and is configured to engage with the plunger of the dispensing apparatus during compression of the container, is the same structure as the protrusion, which is formed on an internal surface of the first end wall 14 and is configured to engage with and lock into an opposing recess 16 on an internal surface of second end wall 15 or of the lid 7.

The deformable container 3 depicted in FIG. 4 includes a recess/protrusion 11 at first end wall 14. In certain embodiments, recess/protrusion 11 is configured to engage with, and lock into, a recess 16 formed in lid 7, thereby forming a locking mechanism for locking container 3 in a flattened shape following compression and extrusion of the product from volume 9.

In other embodiments, deformable container 3 may have both locking mechanisms, namely lip 17 configured to hold each pleat of side wall 6, as well as recess/protrusion 11 configured to engage with recess 16 in lid 7. In the embodiment shown in FIG. 12, lid 7 includes a recess 16 for engagement with a recess/protrusion 11 as well as lip 17, but it is also contemplated that lid 7 may include either one or the other.

Figure 13:
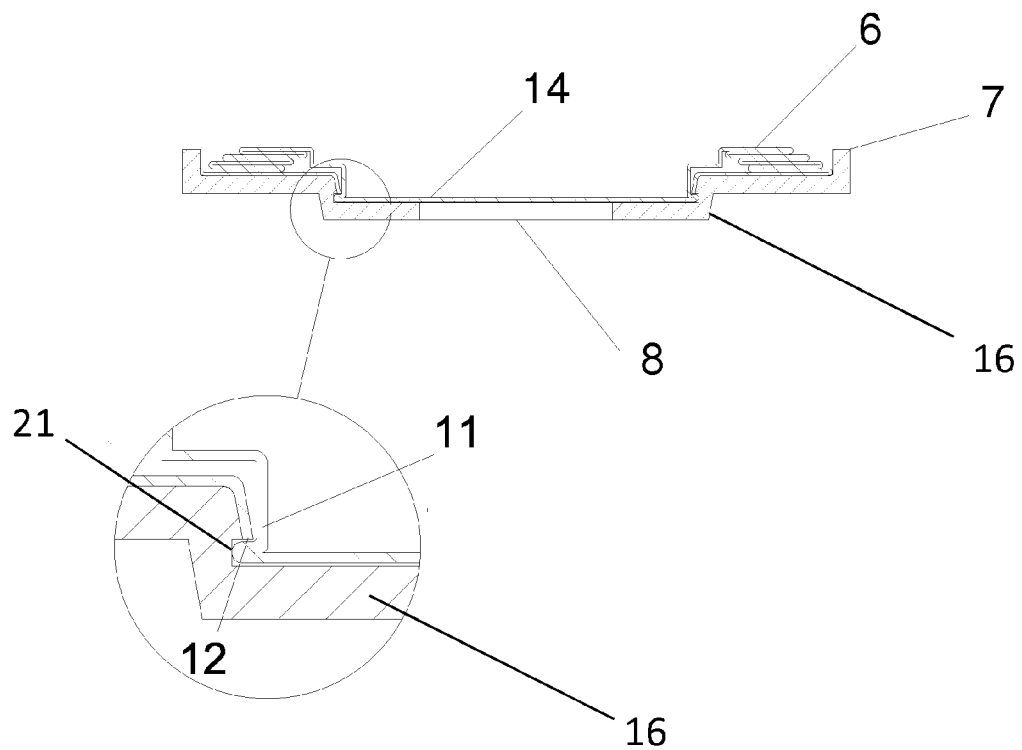
FIG. 13 shows a cross-sectional view of a deformable container of FIG. 4 having a locking mechanism according to aspects of certain embodiments of the present invention.

In one embodiment of this locking mechanism, as illustrated in FIGS. 4 and 6, recess/protrusion 11 of deformable container 3 is configured to engage with recess 16 of lid 7 by friction fit, thereby locking into recess 16. In another embodiment of this locking mechanism, as illustrated in FIGS. 6 and 13, recess 16 of lid 7 may also have at least one sideways projection or lip 12 formed as a protrusion on the edge of the internal surface of the first end wall 14, which snaps/locks into at least one notch 21 of recess 16. As shown in FIG. 13, recess 16 on the internal surface of lid 7 includes one groove or notch 21 configured to engage with a sideways projection or lip 12 formed as a protrusion on the edge of the internal surface of the first end wall 14.

In one embodiment, the groove/notch 21 extends completely or substantially around the entire periphery of the lid recess. In another embodiment, the lid recess 16 includes at least one notch 21 or a plurality of notches 21 arranged radially around the periphery of the lid recess 16, and the first end wall protrusion 14 includes a corresponding number of lips 12 configured to engage the one or more notches. In these embodiments, the at least one lip 12 on the first end wall protrusion is configured to snap into at least one notch 21 on the lid recess, thereby locking the first end wall 14 onto the lid 7 and maintaining the flattened shape of the container following product dispensing.

It is noted that, while FIG. 13 depicts a deformable container according to a first embodiment of the present invention, deformable containers according to any one of the embodiments disclosed herein may include the locking mechanism depicted in FIG. 13.

For example, the second embodiment of the deformable container 3, as depicted in FIG. 7, may include either the lip locking mechanism or the recess locking mechanism or both. As shown in FIG. 7, deformable container 3 may include a recess/protrusion 11 on first end wall 14. FIG. 8a shows a cross-sectional view of one type of lid 7 for deformable container 3 with a corresponding recess, while FIG. 8b shows a cross-sectional view of another type of lid 7 for deformable container 3 with a recess 16 corresponding to recess/protrusion 11. In the embodiment depicted in FIG. 8b, recess/protrusion 11 of first end wall 14 is configured to engage with, and lock into, recess 16 of lid 7 thereby maintaining the flattened shape of deformable container 3.

Figure 10:
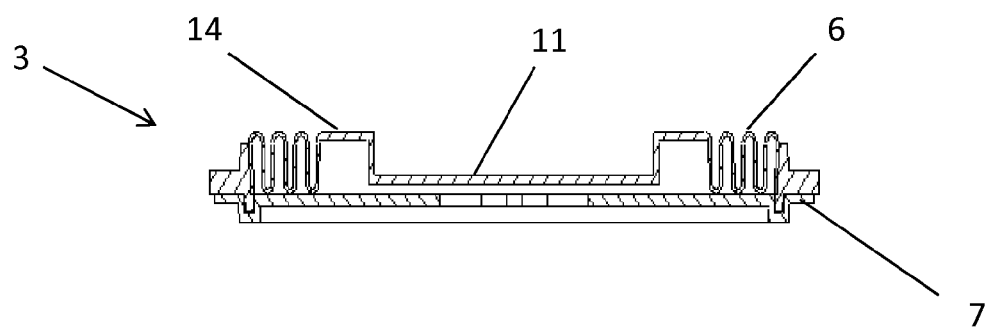
FIG. 10 shows a cross-sectional view of the deformable container of FIG. 7 with the lid of FIG. 8a in a substantially flattened or compressed configuration according to aspects of certain embodiments of the present invention.

Reference is now made to FIG. 10, which shows a cross-sectional view of the container 3 of FIG. 7 with the lid 7 of FIG. 8a in a fully compressed (e.g., flattened) configuration according to aspects of the second embodiment of the present invention. As depicted in FIG. 10, the plurality of pleats of the at least one side wall 6 are arranged adjacent to each other in vertical alignment in the collapsed position. FIG. 11 shows a cross-sectional view of the container 3 of FIG. 7 with the lid 7 of FIG. 8b in a fully compressed (e.g., flattened) configuration according to aspects of the second embodiment of the present invention. The embodiment depicted in FIG. 11 depicts the recess locking mechanism as discussed above, wherein first end wall 14 includes a recess/protrusion 11 configured to engage with, and lock into, a corresponding recess 16 in lid 7. The recess locking mechanism is configured to maintain deformable container 3 in a flattened shape following extrusion of the product from volume 9.

In some embodiments, this locking may take place by friction fit of the internal side of plunger recess 11 into opposing recess 16. In this embodiment, operating the plunger of the dispensing apparatus may facilitate locking the deformable container in a flattened configuration following compression and extrusion of the product from volume 9.

Figure 14:
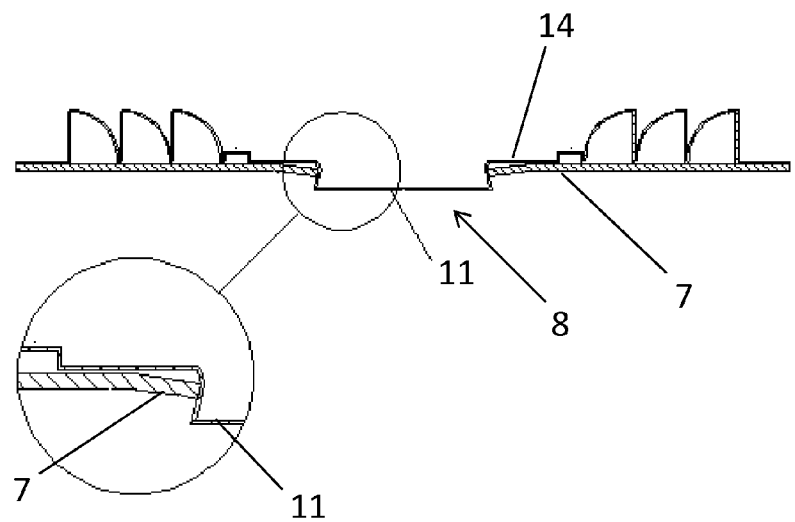
FIG. 14 shows a cross-sectional illustration of a deformable container having a locking mechanism according to aspects of certain embodiments of the present invention.

FIG. 14 shows a cross-sectional illustration of a further alternative embodiment of this locking mechanism, wherein outlet opening 8 of lid 7 acts as the receiving area for a protrusion 11 on first end wall 14. In this embodiment, outlet opening 8 serves as the lid recess (in place of recess 16) that is configured to accept a protrusion 11 arranged on the first end wall 14. In this embodiment, the lid 7 may be substantially flat in shape thereby further helping to reduce the volume occupied by the flattened deformable container 3. In some embodiments, protrusion 11 may have a diameter slightly larger than the diameter of outlet opening 8 in order to provide a snug/tight fit of protrusion 11 into outlet opening 8. In other embodiments, protrusion 11 may include a groove extending completely or substantially along an outer periphery thereof and configured to engage with an edge of outlet opening 8, thereby maintaining the deformable container in the substantially flattened configuration.

Outlet opening 8 may be any desired shape but generally includes, without limitation, at least one defined geometric shape (e.g., elliptical, circular, square, rectangular, etc.) configured to accept a correspondingly shaped protrusion (e.g., button) arranged on an internal surface of the first end wall 14. FIG. 9 depicts an outlet opening 8 having a multi-pointed star shape with a circular geometric shape at its radial center according to this embodiment of the invention. It is noted that, in the embodiment of lid 7 depicted in FIG. 9, outlet opening 8 has a star shaped configuration, but other shapes of outlet opening 8 are contemplated. It is also noted that the outlet opening 8 depicted in FIG. 9 includes a substantially circular center. This circular center may be the at least one defined geometric shape (e.g., elliptical, circular, square, rectangular, etc.) configured to accept a correspondingly shaped protrusion (e.g., button) arranged on an internal surface of the first end wall 14 as discussed above.

In operation, when first end wall 14 with protrusion 11 is pushed downward, by plunger 13 of the dispensing apparatus, towards lid 7 with outlet opening 8, the container is compressed as illustrated in FIG. 14. The larger diameter protrusion 11 is pushed through the smaller diameter outlet opening 8, thereby deflecting the open edges of outlet opening 8 and locking protrusion 11, and first end wall 14, into lid 7. In this position, the inward facing edges of outlet opening 8, whether in the star shaped configuration or in other shapes, provide the gripping force around the periphery of protrusion 11, such as by engaging a groove extending along the outer periphery of protrusion 11, so as to maintain the position of protrusion 11 within outlet opening 8.

It is noted that, while FIG. 14 depicts a deformable container 3 according to a third embodiment of the present invention discussed below, deformable containers according to any one of the embodiments disclosed herein may include the locking mechanism depicted in FIG. 14.

It is noted that other configurations of the locking mechanism are contemplated. For example, the recess 16, or outlet opening 8, and the protrusion on the first end wall 14 do not have to be the same structure, but may be separate and distinct structural features of the deformable container. It is also noted that the deformable container does not necessarily require a locking mechanism, or the deformable container may include more than one locking mechanism as desired or required.

Figures 16A, 16B, 16C:
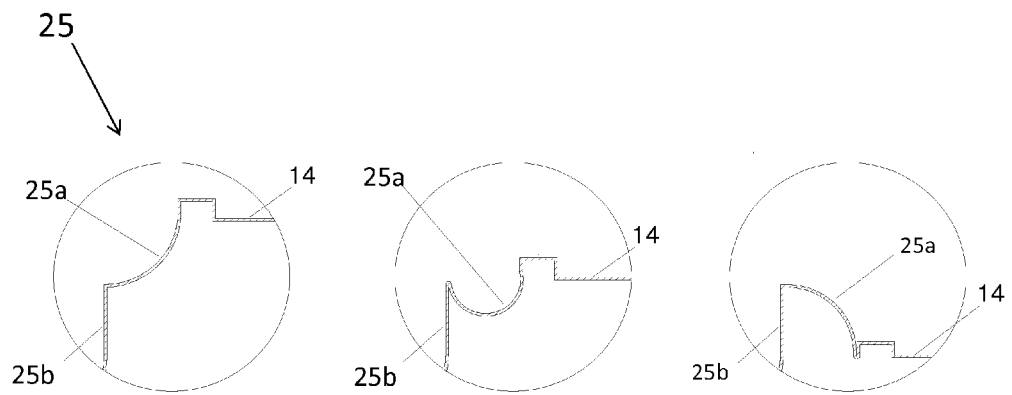
FIGS. 16a-c show cross-sectional illustrations depicting the manner in which a wall segment of deformable container of FIG. 15 folds/collapses according to aspects of certain embodiments of the present invention.
Figure 17:
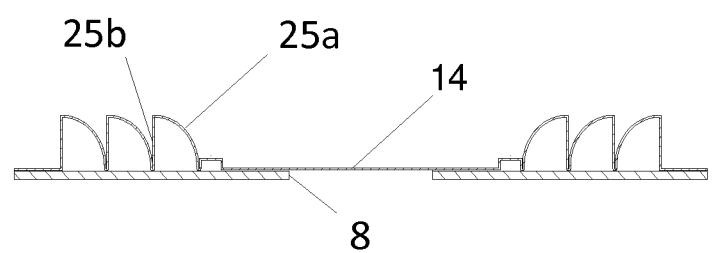
FIG. 17 shows a cross-sectional view of a deformable container of FIG. 15 in a flattened configuration according to aspects of certain embodiments of the present invention.

In yet another alternative embodiment, as shown in FIGS. 15-17, the locking mechanism of the container occurs as a natural result of the deformation of the at least one side wall 6 of the deformable container 3. Reference is now made to FIG. 15, which is a cross-sectional view of a deformable container 3 with collapsible side walls 6 according to aspects of a third embodiment of the present invention. As depicted in FIG. 15, deformable container 3 according to this third embodiment includes, inter alia, a first end wall 14, at least one collapsible side wall 6, and lid 7 having outlet opening 8. In this embodiment, at least one side wall 6 includes at least one, preferably a plurality, of concentric wall segments 25. Each wall segment 25 is stacked, adjoining and adjacent, and together form a frustoconical shape of the at least one side wall 6 of deformable container 3. For example, the wall segments 25 are arranged from first end wall 14 to lid 7 such that each wall segment 25 has a greater diameter/circumference than the adjacent wall segment 25 preceding it.

Each concentric wall segment 25 includes an arcuate or curved section 25*a* and a straight/vertical section 25*b* in the direction extending from first end wall 14 to lid 7. In other words, each concentric wall segment 25 includes a concentric partially rounded element 25*a* and a concentric straight wall 25*b*. Each straight section 25*b* may be arranged vertically such that it has no change in diameter in its respective section of side wall 6, while each curved section 25*a* may have a diameter that increases along the curve in a direction from first end wall 14 to lid 7 as depicted in FIG. 15. In this embodiment, each wall segment has a certain elasticity, and the at least one curved section 25*a* of each wall segment 25 is configured to be inverted and to snap into that inverted configuration when the force applied during compression of the at least one side wall 6 surpasses a critical threshold, thereby serially locking each wall segment 25 in that inverted configuration as the deformable container 3 is collapsed during product dispensing.

Reference is now made to FIGS. 16*a-c*, which are cross-sectional illustrations depicting the manner in which a wall segment 25 folds/collapses according to aspects of the third embodiment of the present invention. FIG. 16*a* shows a wall segment 25, including curved section 25*a* and a straight section 25*b*, in a fully expanded configuration such as depicted in the fully expanded illustration of deformable container 3 in FIG. 15. As depicted in FIG. 16*b*, upon receiving pressure or force from a source (e.g., plunger 13) pushing on an external surface of first end wall 14 in a downward direction towards lid 7, curved section 25*a* bends, contorts, deforms or flexes into a more semi-circular configuration, while straight section 25*b* remains substantially unchanged. As the force from plunger 13 is increased, first end wall 14 is pushed further in a downward direction toward lid 7, such that curved section 25*a* is flexed further, whereupon application of a critical force past the critical threshold causes curved section 25*a* to snap into an inverted arcuate or curved configuration, as depicted in FIG. 16*c*.

While FIGS. 16*a-c* depicts a wall segment 25 directly adjacent to first end wall 14, upon application of further pressure from plunger 13 pushing in a downward direction on the external surface of first end wall 14, the remaining plurality of wall segments 25 collapse serially, in a similar manner as that depicted in FIGS. 16*a-c*, until deformable container 3 reaches a substantially flattened configuration such as illustrated in FIG. 17.

The deformable container 3 according to this third embodiment, as depicted in FIGS. 15-17, may be formed by thermoforming, and the at least one side wall 6 may have a thickness of approximately 0.1 to 0.2 mm, while lid 7 has a thickness of approximately 1 to 2 mm. The greater thickness of lid 7 provides greater structural support for the relatively thin side walls 6. Additionally, the relative thinness of the side wall 6 may produce a rebound action of the side wall following compression to a flattened configuration. Accordingly, it is contemplated that deformable container 3 has at least one locking mechanism for locking the container in a flattened configuration.

For example, deformable container 3 according to this third embodiment depicted in FIGS. 15-17 may have a locking mechanism, such as a locking mechanism as discussed above. However, it is contemplated that this embodiment is self-locking (as described below) and does not require a separate locking mechanism.

When deformable container 3 is placed in an operational position on the platform of the dispensing apparatus, plunger 13 fits into, and engages with, correspondingly-shaped recess 11 at the first end wall 14 of container 3, and pushes first end wall 14 downward, thereby compressing first end wall 14 towards cover 7 sitting on platform 4, and thereby extruding the product through outlet opening 8. When the downward, linear force is applied to container 3, the rounded inclined element 25a begins to compress, as shown in FIG. 16b, going through a critical point in which it snaps into an inverted configuration, as shown in FIG. 16c. When the curved section 25a reaches its final position as depicted in FIG. 16c, deformable container 3 self-locks itself because the force provided by snapping curved sections 25a into adjacent straight sections 25b will cause straight sections 25b to stretch, thus locking wall segments 25 and preventing them from jumping (e.g., rebounding) back up.

During this inversion process, as depicted in FIGS. 16a-c, the respective curved sections 25a and straight sections 25b become slightly elastically deformed. When the container 3 is being pushed downward and collapsed by a force from plunger 13, so to extrude the product, the rounded elements 25a are flexed and the inclined wall elements begin to snap into place concentrically all the way around side walls 6. For this reason, the container 3 structure made of a thick lid 7 connected to relatively thin side walls 6 is configured to resist changes and sustain the shape of container 3 as it is prior to dispensing of product. Each compressed ring of container 3 fits inside the next larger diameter ring, thereby keeping the horizontal alignment during container compression. After the container 3 becomes fully compressed with complete extrusion of product, it will maintain a substantially flattened shape, due the self-locking mechanism described above. The empty, self-locked container 3 may then be disposed of, and the dispensing machine is ready for a subsequent use.

Reference is now made to FIG. 18, which shows a cross-sectional view of a deformable container 3 with collapsible side walls 6 having curved elements according to aspects of a fourth embodiment of the present invention. In this fourth embodiment, deformable container 3 includes, inter alia, a first end wall 14, at least one side wall 6, and a lid/cover 7 having outlet opening 8. In embodiment, the at least one side wall 6 includes a plurality of segments 26 having straight elements 26a connected by curved portions 26b.

Similar to the embodiment depicted in FIGS. 15-17, the at least one side wall 6 of this fourth embodiment includes at least one, preferably a plurality of, concentric wall segments 26, as depicted in the circled portion of FIG. 18. Each wall segment 26 is stacked, adjoining and adjacent, and together form a frustoconical shape of the at least one side wall 6 of deformable container 3. For example, the wall segments 26 are arranged from first end wall 14 to lid 7 such that each wall segment 26 has a greater diameter/circumference than the adjacent wall segment 26 preceding it.

As shown in FIG. 18, each wall segment 26 includes a straight section 26a and at least one curved section 26b. Each straight section 26a extends in the direction from the first end wall to the second end wall (or lid) and has no change in diameter in its respective wall segment 26, while each curved portion 26b has a changing diameter as it curves from the straight section 26a of one wall segment 26 to the straight section 26a of an adjacent wall segment 26.

Figure 19:
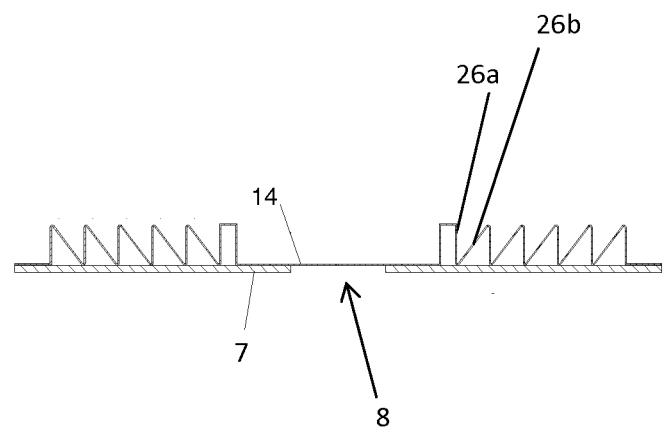
FIG. 19 shows a cross-sectional view of the deformable container of FIG. 18 in a collapsed configuration according to aspects of certain embodiments of the present invention.

Wall segments 26 collapse in a manner similar to the collapse of wall segments 25 depicted in FIGS. 16a-c. FIG. 18 shows a cross-sectional view of the deformable container 3 with a plurality of wall segments 26 in a fully expanded configuration, and FIG. 19 shows a cross-sectional view of the deformable container 3 of FIG. 18 in a collapsed configuration. Upon receiving pressure from a source (e.g., plunger 13) pushing on an external surface of first end wall 14 in a downward direction towards lid 7, straight section 26a pushes curved portion 26b downward, thereby bending, contorting, flexing or deforming curved portion 26b, while straight section 26a remains substantially unchanged. As the force from plunger 13 is increased, first end wall 14 is pushed further in a downward direction toward lid 7, such that curved section 26b is flexed further, whereupon application of a critical force past the critical threshold causes curved section 26b to snap into an inverted configuration as depicted in FIG. 19. Upon receiving further pressure from plunger 13 in a downward direction, the remaining plurality of wall segments 26 collapse serially, until deformable container 3 reaches a substantially flattened configuration such as illustrated in FIG. 19.

The deformable container 3 according to this fourth embodiment depicted in FIGS. 18 and 19 may be formed by thermoforming and the at least one side walls 6 may have a thickness of approximately 0.1 to 0.2 mm, while lid 7 may have a thickness of approximately 1 to 2 mm. The greater thickness of lid 7 provides greater structural support for the relatively thin side walls 6.

The deformable container 3 according to this fourth embodiment depicted in FIGS. 18 and 19 may have a locking mechanism, such as a locking mechanism as discussed above, although it is contemplated that this embodiment is self-locking such as the embodiment depicted in FIGS. 15-17 and does not require a separate locking mechanism.

When the downward, linear force of plunger 13 is applied to container 3, the curved element 26b begins to compress, going through a critical point in which it snaps into place. When the rounded element 26b reaches a final position, deformable container 3 self-locks because the force provided by snapping these rounded elements 26b into adjacent straight walls 26a will cause straight walls 26a to stretch and rounded elements 26b to flex, thus locking them and preventing them from jumping (e.g., rebounding) back up.

It is noted that, while similar to the embodiment shown in FIGS. 15-17, the particular shape of deformable container 3 illustrated in FIGS. 18 and 19 provide less resistance to deformation when it is forced down to dispense the product. In this way, deformable container 3 is more easily compressed and collapsed thereby reducing the energy required to dispense the product.

In certain embodiments, the dispensing apparatus may include a computing system, or similar computing device, that manipulates and/or transforms data represented as physical, such as electronic, quantities within the computing system's registers and/or memories into other data similarly represented as physical quantities within the computing system's memories, registers or other such information storage, transmission or display devices. The computing system may include apparatuses necessary for implementing or using the dispensing apparatus and the deformable container according to the various embodiments described herein. Such apparatuses may be specially constructed for the desired purposes, or may comprise controllers, computers or processors selectively activated or reconfigured by a computer program stored in the computers. Such computer programs may be stored in a computer readable storage medium (e.g., a non-transitory computer readable storage medium), such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EE- PROMs), magnetic or optical cards, or any other type of media suitable for storing electronic instructions, and capable of being coupled to a computer system bus. It will be appreciated that a variety of programming languages may be used to implement the teachings of the invention as described herein.

The computing device of the dispensing apparatus according to certain embodiments of the present invention may include electronic circuitry, wired or wireless transmitters and receivers, input-output ("I/O") interfaces/devices including a display with a user interface, and one or more controllers. A receiver may be used, for example, to receive control information (e.g., to change a mode of operation, to change the value of a parameter, etc.) and various messages. The computing device may further include an article such as a computer or processor readable medium, or a computer or processor storage medium, such as for example a memory, a disk drive, or a USB flash memory, encoding, including or storing instructions, e.g., computer-executable instructions that, when executed by a processor or controller, carry out methods disclosed herein. Processors may include any standard data processor, such as a microprocessor, multiprocessor, accelerator board, or any other serial or parallel high performance data processor.

In certain embodiments, the various containers, apparatuses and devices described herein may be incorporated into a single apparatus or machine (e.g., a vending machine), which may be manually or power-operated. As known in the art, the vending machine may be automated using methods implementing the computing devices described above.

It will be evident to those skilled in the art that the invention is not limited to the details of the foregoing illustrative embodiments and that the present invention may be embodied in other specific forms without departing from the spirit or essential attributes thereof.

The embodiments presented herein are, therefore, to be considered in all respects as illustrative and not restrictive of the scope of the invention, and the skilled artisan will appreciate the appropriate equivalents thereto, which are to be considered as part of this invention.

The invention claimed is:

1. A deformable container comprising:
  a first end wall;
  a second end wall opposing the first end wall;
  at least one collapsible side wall having a plurality of concentric side wall segments wherein each concentric side wall segment has a first diameter corresponding to the straight section thereof and a second diameter corresponding to the curved section thereof, wherein the first diameter of each concentric side wall segment is constant along the length of the straight section thereof, connecting the first and second end walls, each side wall segment comprising at least one straight section having a vertical orientation and at least one curved section connecting the straight section to an adjacent side wall segment,
  wherein, upon extrusion of a dispensable product from said container by a force exerted upon said first end wall in the direction of said second end wall, said at least one collapsible side wall is configured to collapse into a locked configuration wherein said deformable container has a substantially flattened configuration in which each side wall segment is aligned in a vertical orientation adjacent to another side wall segment.

2. The deformable container according to claim 1, wherein the deformable container has a generally frustoconical shape.

3. The deformable container according to claim 1, wherein the straight section of each concentric side wall segment has a diameter larger than the straight section of the diameter of the next concentric side wall segment in the direction from the first end wall to the second end wall.

4. The deformable container according to claim 1, wherein the second diameter of each concentric side wall segment increases along the curved section thereof in a direction from the first end wall to the second end wall.

5. The deformable container according to claim 1, wherein each curved section is configured to flex in response to the force pushing the first end wall toward the second end wall, thereby collapsing the deformable container into the substantially flattened configuration.

6. The deformable container according to claim 5, wherein each curved section is configured to invert upon application of a critical force, thereby maintaining each curved section in an inverted configuration and the deformable container in the substantially flattened configuration.

7. The deformable container according to claim 1, wherein the container is formed by thermoforming.

8. The deformable container according to claim 1, wherein the at least one side wall has a thickness of 0.1 to 0.2 millimeters.

9. The deformable container according to claim 8, further comprising a lid, wherein the lid has a thickness of 1 to 2 millimeters.

10. The deformable container according to claim 1, wherein the first end wall comprises a recess configured to accept a plunger of a dispensing apparatus.

11. The deformable container according to claim 1, wherein each side wall segment comprises at least one straight section and at least two curved sections.

12. The deformable container according to claim 11, wherein each curved section is configured to flex in response to the force pushing the first end wall toward the second end wall, thereby collapsing the deformable container into the substantially flattened configuration.

13. The deformable container according to claim 12, wherein each curved section is configured to straighten upon application of a critical force, thereby maintaining each curved section in a straightened configuration and the deformable container in the substantially flattened configuration.

* * * * *